(12) United States Patent
Yu et al.

(10) Patent No.: US 7,717,724 B2
(45) Date of Patent: May 18, 2010

(54) CONNECTOR CARD HOUSING WITH A SLIDER RESTRAINING PROTRUSION

(75) Inventors: Jian-Fei Yu, Kunshan (CN); Qi-Jun Zhao, Kunshan (CN); Hua Yin, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/384,764

(22) Filed: Apr. 8, 2009

(65) Prior Publication Data
US 2009/0253280 A1 Oct. 8, 2009

(30) Foreign Application Priority Data
Apr. 8, 2008 (CN) .................. 2008 2 0035021 U

(51) Int. Cl.
*H01R 13/62* (2006.01)
(52) U.S. Cl. ..................................... 439/159
(58) Field of Classification Search ................ 439/159, 439/157, 190, 152–155
See application file for complete search history.

(56) References Cited

U.S. PATENT DOCUMENTS

| | | | |
|---|---|---|---|
| 6,394,827 B2 * | 5/2002 | Nogami | 439/159 |
| 6,846,192 B2 | 1/2005 | Tien | |
| 6,981,885 B2 * | 1/2006 | Oh | 439/159 |
| 7,037,125 B1 * | 5/2006 | Kuan et al. | 439/159 |
| 7,329,134 B2 * | 2/2008 | Hsu | 439/159 |
| 7,448,890 B2 * | 11/2008 | Ting | 439/159 |
| 2007/0178733 A1 * | 8/2007 | Sadatoku | 439/159 |

FOREIGN PATENT DOCUMENTS

TW   M293573   7/2006

* cited by examiner

*Primary Examiner*—Chandrika Prasad
(74) *Attorney, Agent, or Firm*—Wei Te Chung; Andrew C. Cheng; Ming Chieh Chang

(57) ABSTRACT

An electrical card connector (100) for insertion of an electrical card (200) includes an insulative housing (1) defining a receiving space (14) for insertion of the electrical card. The insulative housing includes a bottom wall (10) and a side wall (12) extending from a lateral side of the bottom wall. A number of terminals (3) are retained in the insulative housing and extend into the receiving space for electrical connection to the electrical card. An ejecting mechanism (4) includes a slider (41) movable along card-insertion or card-withdraw directions, a coil spring (42) for urging the slider, and a connecting rod (43) having an one-end bend portion retained in the insulative housing and an other-end bend potion movable in a heart-shaped cam groove (412) formed in the slider. The side wall of the insulative housing has a protrusion (125) extending from an upper side thereof to abut downwardly against the slider (41).

17 Claims, 4 Drawing Sheets

CONNECTOR CARD HOUSING WITH A SLIDER RESTRAINING PROTRUSION

BACKGROUND OF THE INVENTION

1. Field of the Invention

The present invention generally relates to an electrical card connector for receiving an electrical card and more particularly to an electrical card connector having an ejecting mechanism for ejecting the electrical card.

2. Description of Related Art

With constant development of communications and computer technology, more and more electrical cards are being designed to meet various requirements. Electrical card connectors are used to connect these electrical cards with corresponding mainframes. A conventional electrical card connector usually comprises an insulative housing, a plurality of terminals coupled thereto, an ejecting mechanism retained in the insulative housing for ejecting the electrical card out of the insulative housing and a shell attached to the insulative housing. The ejecting mechanism includes a slider movable with the electrical card, a coil spring for giving the slider an elastic force to realize ejecting the memory card, and a connecting rod having an one-end bend portion retained in the insulative housing and an other-end bend portion movable in a heart-shaped cam groove formed in the slider. When the shell is assembled to the insulative housing, the shell can prevent Electro-Magnetic Interference (EMI), furthermore, the shell abuts downwardly against the slider so as to retain the slider in the insulative housing.

However, in assembly, the slider may get away from the insulative housing under the elastic force of the coil spring before the shell assembled to the insulative housing, thereby making the assembly process unconvenient.

Hence, an improvement over the prior art is required to overcome the problems thereof.

SUMMARY OF THE INVENTION

According to one aspect of the present invention, an electrical card connector for insertion of an electrical card comprises an insulative housing defining a receiving space for insertion of the electrical card. The insulative housing comprises a bottom wall and a side wall extending from a lateral side of the bottom wall. A plurality of terminals are retained in the insulative housing and extend into the receiving space for electrical connection to the electrical card. An ejecting mechanism comprises a slider movable along card-insertion or card-withdraw directions, a coil spring for urging the slider, and a connecting rod having an one-end bend portion retained in the insulative housing and an other-end bend potion movable in a heart-shaped cam groove formed in the slider. The side wall of the insulative housing has a protrusion extending from an upper side thereof to abut downwardly against the slider.

According to another aspect of the present invention, a push-push type electrical card connector comprises an insulative housing comprising a rear wall, a side wall extending from a lateral side of the rear wall, and a receiving space formed therebetween for insertion of an electrical card. The side wall has a protrusion extending from an inner side thereof. A plurality of terminals are retained in the insulative housing and extend into the receiving space for electrical connection to the electrical card. An ejecting mechanism comprises a slider movably moving with the electrical card. The slider has a lower standoff extending from a lateral side thereof to be abutted downwardly against by the protrusion.

These and additional objects, features, and advantages of the present invention will become apparent after reading the following detailed description of the preferred embodiment of the invention taken in conjunction with the appended drawings.

DETAILED DESCRIPTION OF THE INVENTION

Figure 1:
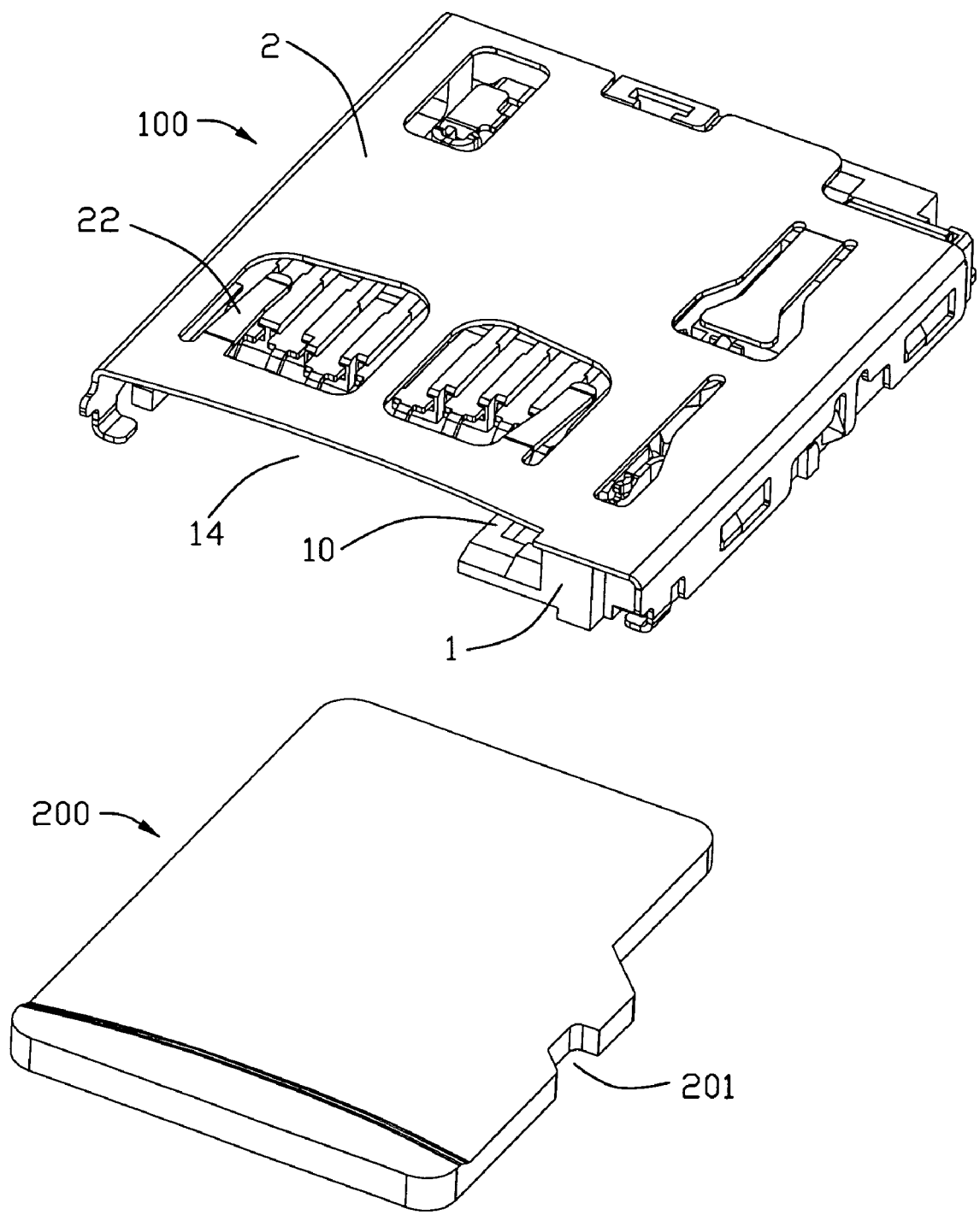
FIG. 1 is a perspective view of an electrical card connector with an electrical card to be received therein according to the present invention.

Reference will now be made to the drawing figures to describe the preferred embodiment of the present invention in detail.

Figure 2:
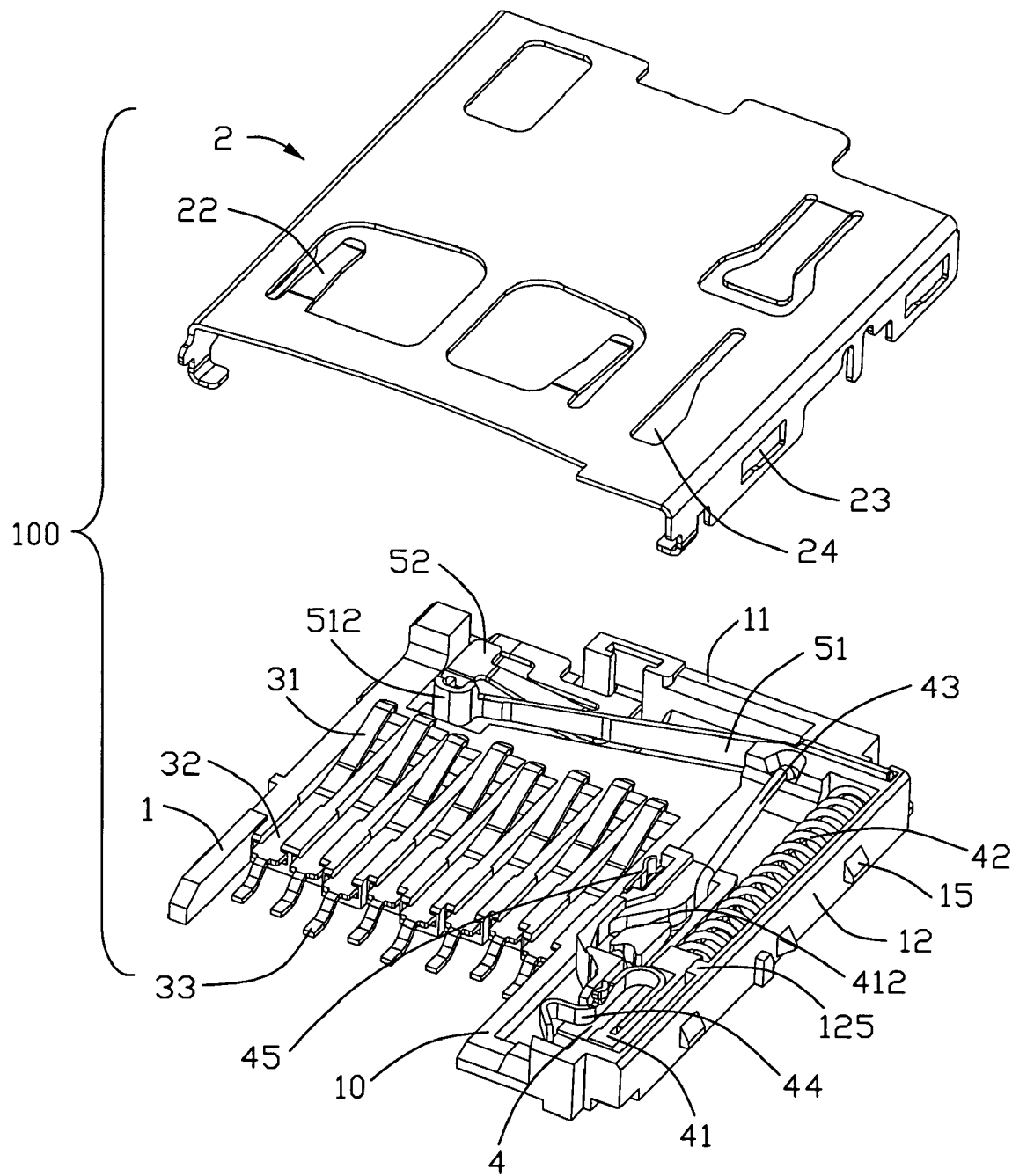
FIG. 2 is a partly exploded view of the electrical card connector shown in FIG. 1.

Referring to FIGS. 1 and 2, an electrical card connector 100 for insertion of an electrical card 200 according to the present invention, comprises an insulative housing 1, a plurality of terminals 3 coupled to the insulative housing 1, an ejecting mechanism 4, a pair of switch contacts 5 retained in the insulative housing 1 and a shell 2 attached to the insulative housing 1. In the preferred embodiment, the memory card connector 100 is a MicroSD card connector for receiving a corresponding MicroSD.

Figure 3:
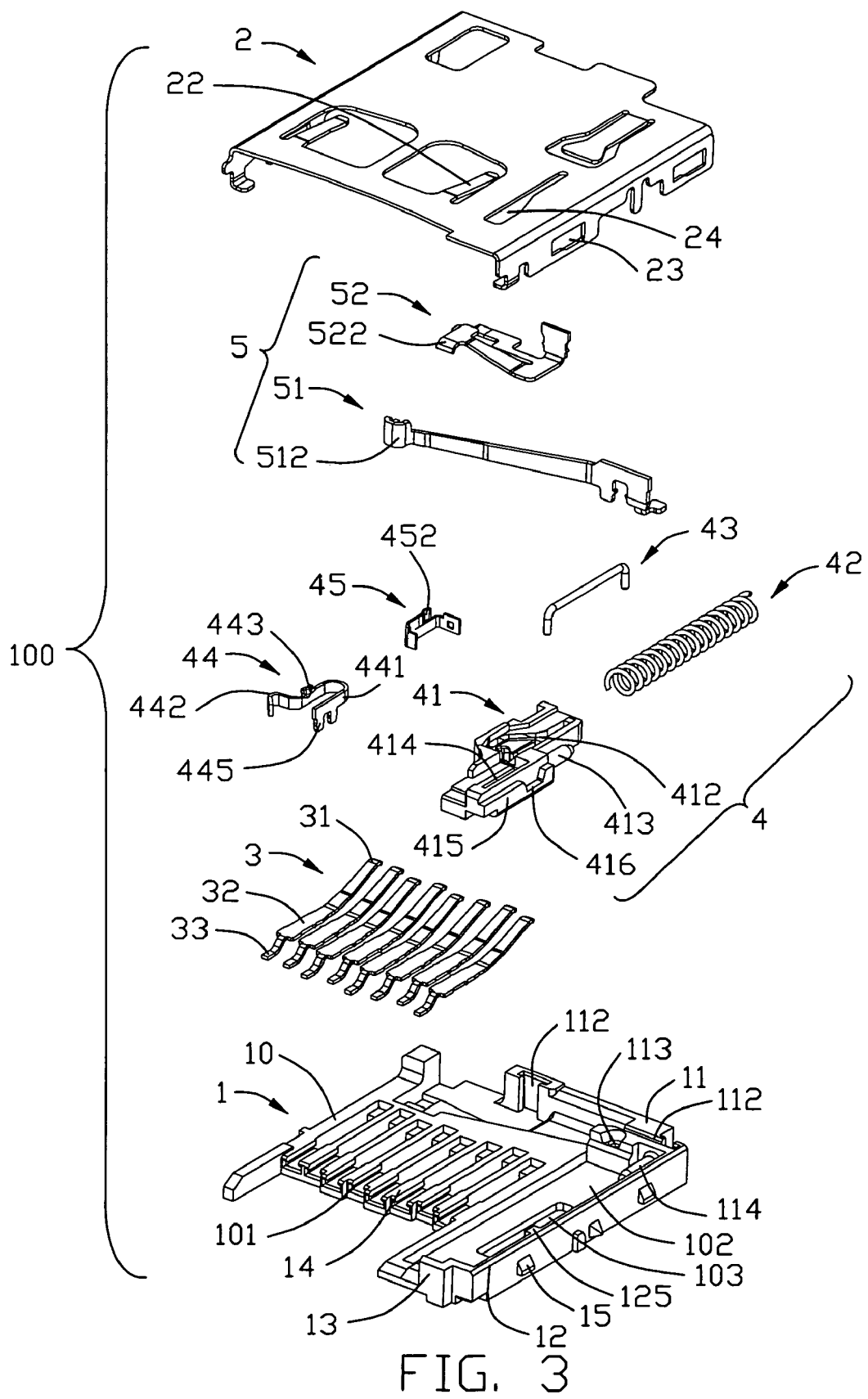
FIG. 3 is an exploded view of the electrical card connector shown in FIG. 1.

Referring to FIGS. 2 and 3, the insulative housing 1 defines a receiving space 14 for insertion of the electrical card 200. The insulative housing 1 comprises a bottom wall 10, a rear wall 11 extending upwardly from a rear end of the bottom wall 10, a side wall 12 extending upwardly from a lateral side of the bottom wall 10 and connecting with the rear wall 11, and a stopping portion 13 extending upwardly from a front end of the bottom wall 10 and connecting with the side wall 12. The bottom wall 10 has a plurality of passageways 101 for retaining the terminals 3 and a slot 102 on a right side of the passageways 101. A through hole 103 under the slot 102 passes through the bottom wall 10 and communicates with the slot 102. The rear wall 11 has a plurality of grooves 112 for retaining the switch contacts 5, an aperture 113 and a first post 114 extending forwardly therefrom. The side wall 12 has a protrusion 125 extending inwardly from an inner and upper side thereof. A pair of projections 15 are formed on two lateral sides of the insulative housing 1.

Each terminal 3 has a connecting portion 32 retained in the passageways 101, a contacting portion 31 extending backwardly from a rear end of the connecting portion 32 and protruding upwardly into the receiving space 14 for electrical connection to the electrical card 200, and a tail portion 33 extending forwardly from a front end of the connecting portion 32 for electrical connection to a printed circuit board (not shown).

Figure 4:
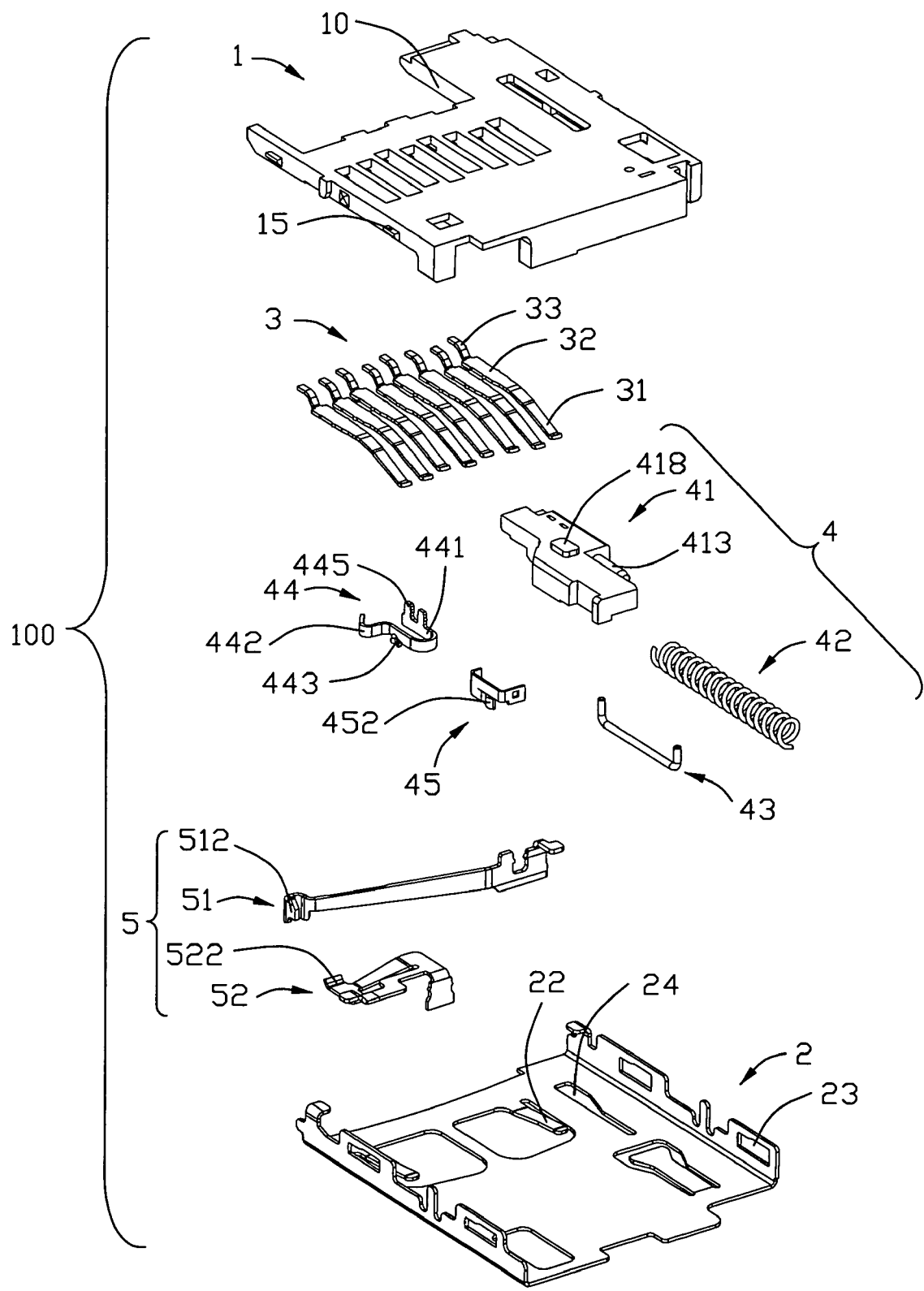
FIG. 4 is an another exploded view of the electrical card connector shown in FIG. 1.

Referring to FIGS. 2-4, the ejecting mechanism 4 is located on a right side of the bottom wall 10 and comprises a slider 41 movable along card-insertion or card-withdraw directions, a connecting rod 43, a coil spring 42 for urging the slider 41, a first spring member 44 fixed to the slider 41 and a second spring member 45 insert molded into the slider 41. The slider 41 is movably received in the slot 102 and has a block 418 on a lower face for movably received in the through hole 103. A heart-shaped cam groove 412 and a cavity 414 are formed on a an upper face of the slider 41. The first spring member 44 includes a U-shaped retaining portion 441 retained in the cavity 414, a cantilevered locking arm 442 extending inwardly from the retaining portion 441 and protruding into the receiving space 14 for locking in an notch 201 of the electrical card 200, a sideward dimple 443 formed on the retaining portion 441, and a pair of legs 445 extending downwardly from the retaining portion 441 to be fixed in the slider 41. A second post 413 extending backwardly from the slider 41. The slider 41 has a standoff 415 extending from a right side thereof and having a top face lower than the upper face of the slider 41. The standoff 415 has a depression 416 recessed downwardly from the top face. In assembling the slider 41 to the slot 102 of the bottom wall 10, the depression 416 on the standoff 415 will accommodate the protrusion 125, and the standoff 415 will not have an interfering engagement with the protrusion 125. Therefore, the slider 4 will be easily assembled to the slot 102 of the bottom wall 10. The second spring member 45 includes a cantilevered resisting arm 452 for abutting against a right lateral side of the electrical card 200 to prevent a rear end of the electrical card 200 from rotating in a clock direction.

The coil spring 42 is assemble between the first and second posts 114, 413. The coil spring 42 gives the slider 41 elastic force to realize ejecting the memory card 200 from the memory card connector 100.

The connecting rod 43 has an one-end bend portion retained in the aperture 113 and an other-end bend portion movably received in the heart-shaped cam groove 412. The memory card connector 100 is so-called push-push type card connector and the working theory of the card ejecting mechanism 4 is well known to those of ordinary skill in the art, so the detailed description is omitted hereinafter. When the slider 41 has been assembled into the slot 102 of the insulative housing 1, the protrusion 125 abuts downwardly against the standoff 415 so as to prevent the slider 41 from moving upwardly away from the insulative housing 1 under the elastic force of the coil spring 42. Therefore, the slider 41 could be retained in the slot 102 firmly without the shell 2. In this way, the shell 2 could be assembled onto the insulative housing 1 conveniently.

Referring to FIGS. 2-4, the switch contacts 5 are retained in the grooves 112 of the rear wall 11 and located at a rear of the receiving space 14. The switch contacts 5 include a first contact 51 and a second contact 52. The first contact includes a first mating portion 512 and the second contact 52 includes a second mating portion 522 in condition that the first and the second mating portion 512, 522 can be selectively on/off determined by the insertion position of the memory card 200.

The shell 2 has a pair of openings 23 for receiving the projections 15. The shell 2 has a pair of spring tabs 22 formed on the shell 5 and extend backwardly into the receiving space 14, and a slit 24 on right side of the spring tabs 22 and extending along the card-insertion direction for the sideward dimple 443 movably received therein.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector for insertion of an electrical card, comprising:
    an insulative housing defining a receiving space for insertion of the electrical card, the insulative housing comprising a bottom wall and a side wall extending upwardly from a lateral side of the bottom wall;
    a plurality of terminals retained in the insulative housing and extending into the receiving space for electrical connection to the electrical card; and
    an ejecting mechanism comprising a slider movable along card-insertion or card-withdraw directions, a coil spring for urging the slider, and a connecting rod having an one-end bend portion retained in the insulative housing and an other-end bend potion movable in a heart-shaped cam groove formed in the slider, wherein
    the side wall of the insulative housing has a protrusion extending from an upper side thereof to abut downwardly against the slider.

2. The electrical card connector as claimed in claim 1, wherein the slider has an upper face, a standoff extends from a lateral side of the slider and has a top face lower than the upper face, the protrusion abuts against the top face of the standoff.

3. The electrical card connector as claimed in claim 2, wherein the bottom wall of the insulative housing has a slot for the slider being movably received therein.

4. The electrical card connector as claimed in claim 3, wherein the bottom wall of the insulative housing has a through hole under the slot and communicating with the slot, the slider has a block movably received in the cavity.

5. The electrical card connector as claimed in claim 2, wherein the standoff has a depression recessed downwardly from the top face thereof to receive the protrusion.

6. The electrical card connector as claimed in claim 1, wherein the insulative housing has a stopping portion extending from a front end of the bottom wall and connecting with the side wall to prevent the slider from moving forwardly.

7. The electrical card connector as claimed in claim 1, wherein the ejecting mechanism further comprises a first spring member having a retaining portion fixed to the slider and a cantilevered locking arm protruding into the receiving space to lock the memory card.

8. The electrical card connector as claimed in claim 7, wherein the electrical card connector further comprising a shell attached to the insulative housing, the shell defines a slit extending along the card-insertion direction, the first spring member has a sideward dimple formed on the retaining portion and protruding into the slit to be movably received in the slit.

9. The electrical card connector as claimed in claim 1, wherein the ejecting mechanism further comprises a second spring member being insert molded into the slider and having a cantilevered resisting arm to abut against a lateral side of the electrical card.

10. A push-push type electrical card connector, comprising:
    an insulative housing comprising a bottom wall, a side wall extending upwardly from a lateral side of the bottom wall, and a receiving space formed therebetween for insertion of an electrical card, the side wall having a protrusion extending laterally from an inner side thereof and spaced from the bottom wall along a height direction of the insulative housing;
    a plurality of terminals retained in the insulative housing and extending into the receiving space for electrical connection to the electrical card; and an ejecting mechanism comprising a slider movable with the electrical card, the slider having a lower standoff extending from a lateral side thereof and sandwiched between the bottom wall and the protrusion.

11. The push-push type electrical card connector as claimed in claim 10, wherein the bottom wall has a slot on a later side of the receiving space for the slider being movably received therein.

12. The push-push type electrical card connector as claimed in claim 11, wherein the bottom wall of the insulative housing has a through hole under the slot and communicating with the slot, the slider has a block on a lower face thereof and movably received in the cavity.

13. The push-push type electrical card connector as claimed in claim 11, wherein the standoff has a depression recessed downwardly from a top face thereof for the protrusion passing through in assembling the slider to the slot of the bottom wall.

14. The push-push type electrical card connector as claimed in claim 10, wherein the insulative housing has a stopping portion extending from a front end of the bottom wall and connecting with the side wall to prevent the slider from moving forwardly.

15. A push-push card connector comprising:
an insulative housing defining a bottom wall with a pair of side walls upwardly extending from two opposite side edges of the bottom wall to form an upward facing card receiving cavity;
a metallic shell assembled upon the housing and covering said card receiving cavity;
a slot formed in a side region of the bottom wall adjacent to one of said side walls;
a slider disposed in the slot under said shell and moveable along a front-to-back direction; and
a spring imposing forces upon said slider in a front-to-back direction; wherein
said one of the side walls defines a protrusion to confront downwardly the slider for restringing upward movement of the slider.

16. The push-push card connector as claimed in claim 15, wherein said slider defines a recess to accommodate the protrusion to ease assembling the slider into the slot.

17. The push-push card connector as claimed in claim 15, wherein said protrusion is essentially closely beside the spring so as to efficiently resist said forces imposed by the spring and applied to the slider.

* * * * *